(12) United States Patent  
Pawlik et al.

(10) Patent No.: US 7,147,897 B2
(45) Date of Patent: Dec. 12, 2006

(54) WELDABLE COMPOSITIONS COMPRISING A CONDUCTIVE PIGMENT AND SILICON AND METHODS FOR USING THE SAME

(75) Inventors: Michael J. Pawlik, Glenshaw, PA (US); Ralph C. Gray, Butler, PA (US); Steven D. Perrine, Allison Park, PA (US); Daniel L. Hopkins, Gibsonia, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 664 days.

(21) Appl. No.: 10/288,791

(22) Filed: Nov. 6, 2002

(65) Prior Publication Data

US 2004/0084657 A1  May 6, 2004

(51) Int. Cl.
*B05D 3/02* (2006.01)
*B32B 15/092* (2006.01)
*B32B 27/20* (2006.01)
*B32B 27/38* (2006.01)
*C08L 63/00* (2006.01)

(52) U.S. Cl. .................. 427/386; 428/416; 523/435; 523/443; 523/458

(58) Field of Classification Search ............... None
See application file for complete search history.

(56) References Cited

U.S. PATENT DOCUMENTS

| | | | | |
|---|---|---|---|---|
| 3,888,575 A | * | 6/1975 | Fujii et al. ............... 252/513 |
| 4,849,133 A | | 7/1989 | Yoshida et al. ........... 252/511 |
| 4,889,773 A | | 12/1989 | Campbell et al. ......... 428/552 |
| 5,001,173 A | | 3/1991 | Anderson et al. ......... 523/406 |
| 5,294,265 A | | 3/1994 | Gray et al. ............... 148/250 |
| 5,306,526 A | | 4/1994 | Gray et al. ............... 427/309 |
| 6,217,674 B1 | | 4/2001 | Gray et al. ............... 148/247 |
| 6,312,812 B1 | | 11/2001 | Hauser et al. ............. 428/412 |
| 6,428,630 B1 | * | 8/2002 | Mor et al. ................. 148/254 |
| 6,641,923 B1 | * | 11/2003 | Sadvary et al. ........... 428/447 |
| 2001/0032966 A1 | | 10/2001 | Yukinobu et al. |
| 2005/0065269 A1 | * | 3/2005 | Hintze-Bruning et al. .. 524/492 |
| 2005/0085565 A1 | * | 4/2005 | Hintze-Bruning et al. .. 523/220 |
| 2005/0228113 A1 | * | 10/2005 | Baumer et al. ............ 524/500 |

FOREIGN PATENT DOCUMENTS

| | | |
|---|---|---|
| EP | 0157392 | 10/1985 |
| EP | 0156437 | 9/1988 |
| GB | 2239617 | 7/1991 |
| GB | 2345454 | 7/2000 |
| WO | WO 00/32351 | * 6/2000 |
| WO | WO00/68325 | 11/2000 |
| WO | WO01/30923 | 5/2001 |
| WO | WO01/85860 | 11/2001 |
| WO | WO 03/011984 | 2/2003 |

OTHER PUBLICATIONS

Patent Abstracts of Japan, Pub. No. 63-083172, Apr. 1988.

* cited by examiner

*Primary Examiner*—Michael J. Feely
(74) *Attorney, Agent, or Firm*—Diane R. Meyers; Donald R. Palladino

(57) ABSTRACT

A weldable coating composition is disclosed. The composition comprises a binder in which is dispersed a conductive pigment and a source of silicon. Enhanced corrosion protection is offered, without sacrificing weldability of the coating layer. The composition is applied to and cured on a metal substrate.

25 Claims, No Drawings

WELDABLE COMPOSITIONS COMPRISING A CONDUCTIVE PIGMENT AND SILICON AND METHODS FOR USING THE SAME

FIELD OF THE INVENTION

The present invention relates to weldable coatings for metal substrates, and more specifically, to weldable coatings comprising one or more conductive pigments and a source of silicon.

BACKGROUND OF THE INVENTION

Weldable coatings containing an electrically conductive material, such as a pigment, are often used to provide an electroconductive layer on metal substrates. Unfortunately, many of the conductive pigments do not, by themselves, provide adequate corrosion protection; in some cases, the conductive pigments can actually accelerate corrosion. To provide adequate corrosion protection, corrosion resistant pigments ("CRP") can also be added to weldable primers. Examples include silica or calcium-treated silica. The use of CRPs, however, can often adversely impact welding performance. The use of silicon, a semi-conductive material, has been reported as a replacement for conductive pigments; such formulations, however, often fail to give adequate weld performance. Thus, improved coatings that are both weldable and corrosion resistant are desired.

SUMMARY OF THE INVENTION

The present invention provides a weldable coating comprising both a conductive pigment and a source of silicon. The use of the conductive pigment allows adequate welding to be achieved. The use of silicon provides corrosion protection without significantly interfering with weldability; in some cases, the use of silicon even enhances weldability. It was a surprising discovery that corrosion protection is still provided by the silicon when corrosive, conductive pigments are used.

Silicon is thought to offer corrosion inhibition by acting as a sacrificial anode for the metal being coated. As such, the metal is protected cathodically from corrosion by the silicon. In addition to this cathodic protection, the silicon is also thought to act as an oxygen scavenger. As the various coating layers on a substrate age, water and oxygen slowly diffuse so as to come into contact with the silicon. The silicon reacts with these substances to produce oxides, such as silicon dioxide ($SiO_2$), which protect against corrosion. The inventors do not wish to be bound by any mechanisms, however.

DETAILED DESCRIPTION OF THE INVENTION

The present invention is directed to a weldable composition comprising a binder; a conductive pigment; and a source of silicon. The conductive pigment is dispersed throughout the binder, as is the source of silicon. The conductive pigment provides electroconductivity, while the binder adheres the conductive pigment to the substrate or any pretreatment coating that may be deposited on the substrate. As noted above, the silicon provides corrosion resistance without negatively affecting weldability.

The binder can comprise oligomeric binders, polymeric binders and mixtures thereof. The binder is preferably a resinous polymeric binder material selected from thermosetting binders, thermoplastic binders or mixtures thereof. Suitable thermosetting materials include, for example, polyesters, epoxy-containing materials, phenoxy-containing materials, polyurethanes, and mixtures thereof, in combination with suitable crosslinkers, such as aminoplasts or isocyanates. Examples of suitable thermoplastic binders include high molecular weight epoxy resins, (i.e. number average molecular weight ("Mn")>1000) defunctionalized epoxy resins, vinyl polymers, polyesters, polyolefins, polyamides, polyurethanes, acrylic polymers and mixtures thereof. Other suitable binder materials include phenoxy polyether polyols and inorganic silicates.

A particularly suitable resinous binder comprises a reaction product of one or more epoxy functional materials and one or more phosphorus-containing materials. The reaction product can be a β-hydroxy phosphorus ester having reactive functional groups. These functional groups are typically hydroxyl groups, including acidic hydroxyls, and/or epoxy groups, depending on the equivalent ratio of the phosphorus-containing material to epoxy-containing material. "Phosphorus ester" will be understood as including both phosphate and phosphonate esters.

Suitable epoxy-functional materials for use in preparing the binders of the present invention contain at least one epoxy or oxirane group in the molecule, such as monoglycidyl ethers of a monohydric phenol or alcohol or di- or polyglycidyl ethers of polyhydric alcohols. In one embodiment, the epoxy-functional material contains at least two epoxy groups per molecule and has aromatic or cycloaliphatic functionality to improve adhesion to a metal substrate. In some embodiments, the epoxy-functional materials may be relatively more hydrophobic than hydrophilic in nature. In one embodiment, the epoxy-containing material is a polymer having an Mn of from about 220 to 25,000, such as from 220 to 4500. The Mn can be determined, for example, by multiplying the epoxy equivalent weight (epoxy equivalent) by the epoxy functionality (number of epoxy groups).

Examples of suitable monoglycidyl ethers of a monohydric phenol or alcohol include phenyl glycidyl ether and butyl glycidyl ether. Suitable polyglycidyl ethers of polyhydric alcohols can be formed by reacting epihalohydrins with polyhydric alcohols, such as dihydric alcohols, in the presence of an alkali condensation and dehydrohalogenation catalyst such as sodium hydroxide or potassium hydroxide. Useful epihalohydrins include epibromohydrin, dichlorohydrin and especially epichlorohydrin.

Suitable polyhydric alcohols can be aromatic, aliphatic or cycloaliphatic and include but are not limited to phenols that are at least dihydric phenols, such as dihydroxybenzenes, for example resorcinol, pyrocatechol and hydroquinone; bis(4-hydroxyphenyl)-, 1, 1 -isobutane; 4,4-dihydroxybenzophenone; bis(4-hydroxyphenyl)-1,1-ethane; bis(2-hydroxyphenyl)methane; 1,5-hydroxynaphthalene; 4-isopropylidene bis (2,6-dibromophenol); 1,1,2,2-tetra(p-hydroxy phenyl)-ethane; 1,1,3-tris(p-hydroxy phenyl)-propane; novolac resins; bisphenol F; long-chain bisphenols; and 2,2-bis(4-hydroxyphenyl)propane (bisphenol A), which is especially suitable. Aliphatic polyhydric alcohols that can be used include but are not limited to glycols such as ethylene glycol, diethylene glycol, triethylene glycol, 1,2-propylene glycol, 1,4-butylene glycol, 2,3-butylene glycol, pentamethylene glycol, polyoxyalkylene glycol; polyols such as sorbitol, glycerol, 1,2,6-hexanetriol, erythritol and trimethylolpropane; and mixtures thereof. An example of a suitable cycloaliphatic alcohol is cyclohexanedimethanol.

Epoxy-containing polymers useful in the present invention are disclosed in U.S. Pat. Nos. 5,294,265; 5,306,526 and 5,653,823, which are hereby incorporated by reference. Other useful epoxy-containing materials include epoxy-functional acrylic polymers, glycidyl esters of carboxylic acids and mixtures thereof. Suitable commercially available epoxy-containing polymers are available from Shell Chemical Company under the names EPON 836, EPON 828, EPON 1002F and EPON 1004F. EPON 836 and EPON 828 are epoxy functional polyglycidyl ethers of bisphenol A prepared from bisphenol A and epichlorohydrin. EPON 828 has an Mn of about 400 and an epoxy equivalent weight of about 185 to 192. EPON 836 has an Mn of about 625 and an epoxy equivalent weight of about 310 to 315. EPON 1002F has an Mn of about 1300 and an epoxy equivalent weight of about 650, while EPON 1004F has an Mn of about 1840 and an epoxy equivalent weight of about 920.

As discussed above, the epoxy-containing material is reacted with one or more phosphorus-containing materials to form an ester, such as an organophosphate or organophosphonate. Suitable phosphorus-containing materials include phosphonic acids, phosphorous acid, phosphoric acids including super- and poly-, and mixtures thereof. Phosphoric acids are particularly suitable.

Examples of suitable phosphonic acids include those having at least one group of the structure:

where R is —C—, such as $CH_2$ or $O-CO-(CH_2)_2-$. Nonlimiting examples of suitable phosphonic acids include 1-hydroxyethylidene-1,1-diphosphonic acid, methylene phosphonic acids, and alpha-aminomethylene phosphonic acids containing at least one group of the structure:

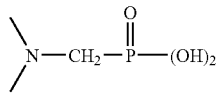

such as (2-hydroxyethyl)aminobis(methylene phosphonic) acid, isopropylaminobis(methylenephosphonic) acid and other aminomethylene phosphonic acids disclosed in U.S. Pat. No. 5,034,556 at column 2, line 52 to column 3, line 43, which is hereby incorporated by reference.

Other useful phosphonic acids include alpha-carboxymethylene phosphonic acids containing at least one group of the structure:

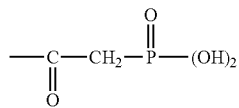

Nonlimiting examples of suitable phosphonic acids include benzylaminobis(methylene phosphonic) acid, cocoaminobis (methylene phosphonic) acid, triethylsilylpropylamino(methylene phosphonic) acid and carboxyethyl phosphonic acid.

The equivalent ratio of the phosphorus-containing material to the epoxy-containing material is within the range of 0.3 to 5.0:1, such as 0.5 to 3.5:1. When using phosphorus to epoxy materials in this ratio, typically only hydroxyl groups will be present on the β-hydroxy phosphorus ester reaction product. The epoxy-containing material and the phosphorus-containing material can be reacted together by any suitable method known to those skilled in the art, such as the reverse phosphatization reaction in which the epoxy-containing material is added to the phosphorus-containing material.

The resinous binder of the present invention also typically comprises a curing agent having functional groups that are reactive with the functional groups of the epoxy/phosphorous reaction product described above. The curing agent can be selected from aminoplasts, polyisocyanates, polyacids, organometallic acid-functional materials, polyamines, polyamides and mixtures of these, depending on the functional groups present in the reaction product. The selection of the appropriate curing agent(s) is well within the skills of those practicing in the art.

Suitable aminoplasts can be obtained from the condensation reaction of formaldehyde with an amine or amide. Examples include but are not limited to melamine, urea and benzoguanamine. Although condensation products obtained from the reaction of alcohols and formaldehyde with melamine, urea or benzoguanamine are most common, condensates with other amines or amides can be used. For example, aldehyde condensates of glycoluril, which yield a high melting crystalline product useful in powder coatings, can be used. Formaldehyde is the most commonly used aldehyde, but other aldehydes such as acetaldehyde, crotonaldehyde, and benzaldehyde can also be used.

The aminoplast can contain imino and methylol groups. A particularly suitable aminoplast is a melamine formaldehyde condensate having imino groups, especially such an aminoplast having at least 40 weight percent imino groups. In certain embodiments, at least a portion of the methylol groups can be etherified with an alcohol to modify the cure response. Any monohydric alcohol like methanol, ethanol, n-butyl alcohol, isobutanol, and hexanol can be employed for this purpose. Suitable aminoplast resins are commercially available, for example, from Cytec Industries, Inc. in its CYMEL line and from Solutia, Inc. in its RESIMENE line. Particularly suitable products are CYMEL 385 (especially for water-based compositions), CYMEL 1158 iminofunctional melamine formaldehyde condensates, and CYMEL 303.

As noted above, polyisocyanate curing agents can also be used. As used herein, the term "polyisocyanate" is intended to include blocked (or capped) polyisocyanates as well as unblocked polyisocyanates. The polyisocyanate can be aliphatic, aromatic, or mixtures thereof. Although higher polyisocyanates such as isocyanurates of diisocyanates are often used, diisocyanates can be used. Higher polyisocyanates also can be used in combination with diisocyanates. Isocyanate prepolymers, for example reaction products of polyisocyanates with polyols, can also be used, as can mixtures of polyisocyanates.

If the polyisocyanate is blocked or capped, any suitable aliphatic, cycloaliphatic, or aromatic alkyl monoalcohol known to those skilled in the art can be used as a capping agent for the polyisocyanate. Other suitable capping agents include oximes and lactams. Other useful curing agents comprise blocked polyisocyanate compounds, such as the tricarbamoyl triazine compounds described in detail in U.S. Pat. No. 5,084,541, which is incorporated herein by reference. U.S. Pat. No. 4,346,143, column 5, lines 45–62, describes blocked or unblocked di- or polyisocyanates such as toluene diisocyanate blocked with caprolactam and is also incorporated by reference herein. A toluene diisocyanate blocked with caprolactam is commercially available from Bayer Corporation as DESMODUR BL 1265.

Suitable polyacid curing agents include acid group-containing acrylic polymers prepared from an ethylenically unsaturated monomer containing at least one carboxylic acid group and at least one ethylenically unsaturated monomer that is free from carboxylic acid groups. Such acid functional acrylic polymers can have an acid number ranging from 30 to 150. Acid functional group-containing polyesters can be used as well. Polyacid curing agents are described in further detail in U.S. Pat. No. 4,681,811 at column 6, line 45 to column 9, line 54, which is incorporated herein by reference.

Useful organometallic complexed materials that can be used as curing agents include a stabilized ammonium zirconium carbonate solution commercially available from Magnesium Elektron, Inc. as BACOTE 20, stabilized ammonium, zirconium carbonate, and a zinc-based polymer crosslinking agent commercially available from Ultra Additives Incorporated as ZINPLEX 15.

Examples of suitable polyamine curing agents include primary or secondary diamines or polyamines in which the radicals attached to the nitrogen atoms can be saturated or unsaturated, aliphatic, alicyclic, aromatic, aromatic-substituted-aliphatic, aliphatic-substituted-aromatic, and heterocyclic. Suitable aliphatic and alicyclic diamines include 1,2-ethylene diamine, 1,2-propylene diamine, 1,8-octane diamine, isophorone diamine, propane-2,2-cyclohexyl amine, and the like; suitable aromatic diamines include phenylene diamines and toluene diamines, for example o-phenylene diamine and p-tolylene diamine. These and other suitable polyamines are described in detail in U.S. Pat. No. 4,046,729 at column 6, line 61 to column 7, line 26, which is incorporated herein by reference.

Appropriate mixtures of curing agents may also be used in the invention.

The weight percent of the binder in the present compositions typically ranges from about 20 to 90 percent, such as 30 to 80 percent, or 35 to 75 percent, with weight percent based on the total weight of the composition.

The weight percent of the curing agent, if used, generally ranges from 5 to 60 weight percent based on the total weight of the resinous binder.

The present compositions also comprise an electroconductive pigment ("conductive pigment") dispersed in the binder. Conductive pigment, as used herein, refers to a pigment that, on a molecular scale, has a partially filled band of "energy equivalent" molecular orbitals. This partially filled band has many "unpaired" electrons that are able to move freely from atom to atom within the conductive pigment matrix. The free flow of electrons within the matrix produces an electric current. Conductive pigments are distinguished from semi-conductive pigments, which are substances having two separate bands of "energy equivalent" molecular orbitals that are very close in energy. The lower energy band is completely filled with "paired" electrons and the higher energy band is completely empty of electrons. Since the energy gap between the two bands is very small, thermal energy can promote electrons from the lower filled band to the higher unfilled band producing band(s) that have small numbers of unpaired electrons, which in turn permits the establishment of a weak electric current. Examples of suitable conductive pigments include zinc, aluminum, graphite, iron phosphide, tungsten, carbon black, iron, stainless steel, and mixtures thereof. Suitable zinc pigments are commercially available from Zincoli GmbH as ZINCOLIS 620 or 520. Suitable iron phosphide pigments are commercially available from Glenn Springs Holdings in their FERROPHOS line.

The conductive pigment is dispersed in the binder such that the coating composition, when deposited and cured on a metal substrate, is weldable. The term "weldable" describes a composition that is sufficiently conductive to sustain a spot welding and joining operation, such as those used in an automotive assembly plant. The weight ratio of the conductive pigment to the resin is about 0.2 to 10, such as about 0.5 to 2.0. Also, the weight percent of conductive pigment based on the total weight of the composition is from about 2 to 70 weight percent.

The present compositions further comprise a source of silicon. Silicon can be obtained, for example, in powder form or pieces. For use in the present invention, the average particle size of silicon can be 0.2 to 10 microns, such as 1 to 5 microns. The size of the silicon particle used can be determined based on the desired thickness of the coating layer. Silicon is commercially available in a number of grades, such as technical grade, high purity and ultra-high purity. High purity silicon is a waste product of wafer production in the electronics industry and is therefore readily available. Suitable commercially available products include SI-1059 from Elkem (average particle size of <10μ; 99.20% silicon) and SI-100 from AEE (average particle size between 1 and 5μ; 99.20% silicon). The weight ratio of silicon to conductive pigment is typically from about 0.02 to 2.0. The weight percent of silicon in the total composition is typically from about 0.5 to 30. It has been found that use of silicon above the upper weight percent can impede weldability, although such amounts can be used if desired by the user, particularly if enhanced corrosion protection is desired.

The present coating compositions may contain a diluent added to adjust the viscosity of the coating composition. For application to a substrate, the present compositions should typically have a viscosity of from about 30 to 180 seconds as measured by a No. 4 Ford Cup. If a diluent is used, it should be selected so as not to detrimentally affect the adhesion of the curable coating composition to a metal substrate. Useful diluents include water ("aqueous based"), organic solvents ("solvent based") or mixtures of water and organic solvents (which would be referred to as either aqueous based or solvent based depending on which is the major diluent). Water is preferred in many applications, as the use of aqueous-based forms of the present composition can actually result in increased weldability of the coating layer deposited therefrom, as compared with its solvent-based counterpart.

When water is included as a diluent, dispersants, thickeners, stabilizers, rheology modifiers, and anti-settling agents are typically used as well. A suitable rheology modifier is available from Rohm and Haas Company as Rheology Modifier RM-8, Experimental. A suitable stabilizing and dispersing agent is potassium tripolyphosphate (KTPP).

Optimally, the aqueous composition contains an amine. Particularly suitable amines are hydroxyl-containing amines. The volatile organic compound content (VOC content) of the aqueous composition will typically be less than 2.4, such as less than 1.7, as determined by Method 24, which will be familiar to those skilled in the art.

The diluent of the present invention can also be an organic solvent. Suitable organic solvents include alcohols having up to about 8 carbon atoms, such as ethanol and isopropanol, and alkyl ethers of glycols, such as 1-methoxy-2-propanol, and monoalkyl ethers of ethylene glycol, diethylene glycol and propylene glycol. In a particularly suitable embodiment, the diluent includes a propylene glycol monomethyl ether or a dipropylene glycol monomethyl ether. A suitable propylene glycol monomethyl ether is available from Dow Chemical Company as DOWANOL PM; a suitable dipropylene glycol monomethyl ether is commercially available as DOWANOL DPM.

Other suitable organic solvents include ketones such as cyclohexanone (preferred), acetone, methyl ethyl ketone, methyl isobutyl ketone and isophorone; esters and ethers such as 2-ethoxyethyl acetate, and propylene glycol methyl ether acetates such as PM ACETATE, commercially available from Dow Chemical Company; and aromatic solvents such as toluene, xylene, and aromatic solvent blends derived from petroleum such as "Solvesso", commercially available from a number of sources.

The solvent-based composition also can contain an amine for stability purposes. The preferred amines are alkyl substituted morpholine compounds such as N-methyl and N-ethyl morpholine.

The compositions of the invention can further comprise surfactants. Surfactants can be used to improve the wetting of the substrate. Generally, surfactants are present in an amount of less than about 2 weight percent on a basis of total weight of the coating composition. Suitable surfactants are commercially available from Air Products and Chemicals, Inc. in their SURFYNOL line, such as SURFYNOL 104 PA.

The coating composition of the present invention can also include corrosion resistant pigments. Suitable corrosion resistant pigments include, but are not limited to, zinc phosphate, calcium ion-exchanged silica, colloidal silica, synthetic amorphous silica, and molybdates such as calcium molybdate, zinc molybdate, barium molybdate, strontium molybdate, and mixtures thereof. Suitable calcium ion-exchanged silica is commercially available from W.R. Grace & Co. as SHIELDEX AC3. Suitable colloidal silica is available from Nissan Chemical Industries, Ltd. as SNOWTEX. Suitable amorphous silica is available from W.R. Grace & Co. as SYLOID. If corrosion resistant pigments are used, they are typically not used in amounts that will interfere with weldability, that is, about 20 weight percent or less, based on the total weight of the composition.

Other optional ingredients include inorganic lubricants such as molybdenum disulfide particles that are commercially available from Climax Molybdenum Marketing Corporation, extender pigments such as iron oxides and iron phosphides, flow control agents, thixotropic agents such as silica, montmorillonite clay and hydrogenated castor oil, anti-settling agents such as aluminum stearate and polyethylene powder, dehydrating agents that inhibit gas formation such as silica, lime or sodium aluminum silicate, and wetting agents including salts of sulfated castor oil derivatives such as those commercially available from Cognis Corporation as RILANIT R4.

In one embodiment, the coating compositions are substantially free of chromium-containing materials, i.e., contain less than about 2 weight percent of chromium-containing materials (expressed as $CrO_3$), less than about 0.05 weight percent of chromium-containing materials, or about 0.00001 weight percent. Examples of chromium-containing materials include chromic acid, chromium trioxide, chromic acid anhydride, dichromate salts such as ammonium dichromate, sodium dichromate, potassium dichromate, and calcium chromate. In another embodiment, the present compositions contain no zeolite.

In practice, the coating composition of the present invention will be applied to a metal substrate and then cured. Metal substrates used in the practice of the present invention include ferrous metals, non-ferrous metals and combinations thereof. Suitable ferrous metals include iron, steel, and alloys thereof. Nonlimiting examples of useful steel materials include cold rolled steel, galvanized (zinc coated) steel, electrogalvanized steel, stainless steel, pickled steel, zinc-iron alloy such as Galvanneal, Galvalume and Galfan zinc-aluminum alloys and combinations thereof. Useful non-ferrous metals include aluminum, zinc, magnesium and alloys thereof. Combinations or composites of ferrous and non-ferrous metals can also be used.

At application, the temperature of the coating composition is typically from about 10° C. to 85° C., such as from about 15° C. to 60° C. For aqueous-based coating compositions, the pH of the coating composition at application generally ranges from about 7.0 to about 12.0, such as about 8.0 to about 10.5. Water-soluble or water-dispersible acids and/or bases can be used to adjust pH, if needed.

The weldable compositions of the invention can be applied to the surface of a metal substrate by any conventional application technique, such as spraying, immersion or roll coating in a batch or continuous process. Squeegee or wringer rolls can be used to remove excess coating. After application, the coating is cured to form a cured coating upon the metal substrate. Curing can be achieved at peak metal temperatures of 100 to 400° C. Peak metal temperatures of about 150° C. to about 300° C. are particularly suitable. Cure times typically range from 2 seconds to 60 minutes.

The thickness of the applied coating is determined mainly by the application conditions. Generally, to achieve sufficient corrosion resistance for automotive use, the applied coating will have a film thickness of at least about 1 micrometer (about 0.04 mils), such as from about 1 to 20 micrometers, or from about 2 to 10 micrometers. For other substrates and other applications, thinner or thicker coatings can be used, and can be determined by the user.

EXAMPLES

The following examples are intended to illustrate the invention, and should not be construed as limiting the invention in any way.

Example 1

To a 4-neck 3-liter round-bottom flask fitted with a reflux condenser, a mechanical stirrer and a nitrogen inlet, were charged at ambient temperature 36.9 grams (0.32 mole) of 85% phosphoric acid and 50 grams of propylene glycol monomethyl ether (DOWANOL PM) obtained from Dow Chemical. The mixture was heated with stirring to 99° C. while maintaining a nitrogen blanket. A solution comprising 554 grams (0.3 mole) of diglycidylether from epichlorohydrin and bisphenol A (EPON 1004F obtained from Shell Chemical Company) and 553 grams of DOWANOL PM was added to the flask from an addition funnel at 99° C. to 100° C. over 52 minutes. The reaction mixture was then held at 100° C. for 53 minutes at which time the epoxy equivalent weight was determined to be greater than 20,000. Next, 21.6 grams of deionized water were added and the reaction mixture was held at 100° C. to 104° C. for 123 minutes. The reaction mixture was then cooled to 82° C., and a vacuum was applied; 253 grams of distillate were removed. To the reaction mixture was then added 57 grams (0.64 moles) of dimethylethanol amine dissolved in 100 grams of deionized water over 8 minutes at 82° C. After mixing well, 934.5 grams of deionized water (preheated to approximately 70° C.) were added to the reaction mixture at 72° C. to 57° C. over 30 minutes. The reaction mixture was then cooled and poured into a plastic container. The solids of the resin solution were determined to be 31.1%, and the acid number was determined to be 18.1.

Example 2

At ambient temperature, a water-based low cure coating composition was made by first adding 6.2 grams of potassium tripolyphosphate and 10.0 grams of an alkylol ammonium salt of a high molecular weight carboxylic acid grind aid which reduces pigment settling (EFKA 5071 obtained from Efka Additives BV) to 66.1 grams of deionized water. The mixture was stirred with a Cowles blade for 5 minutes. While continuing to stir the mix with a Cowles blade, the following components were added sequentially in one-minute intervals: 6.2 grams of deionized water; and 418.3 grams of iron phosphide (FERROPHOS HRS-3095 obtained from Glenn Springs Holdings). The resultant mixture was stirred for one hour with a Cowles blade. The following items were then added sequentially in one-minute intervals while continuing to stir the mix with a Cowles blade: 30.5 grams of deionized water; and 49.1 grams of elemental silicon (available from Elkem Metals Co.). The resultant mixture was again stirred for 1 hour with a Cowles blade. A mild heating occurred as a result of the reaction being exothermic. The following items were then added sequentially in one-minute intervals while continuing to stir the mix with a Cowles blade: 10.0 grams of an acetylenic surfactant (SURFYNOL 104DPM obtained from Air Products and Chemicals, Inc); 363.9 grams of the product of Example 1; 4.7 grams of a polyurethane rheology modifier (RM-8 obtained from Rohm and Haas); and 5.0 grams of a proprietary defoamer (SURFYNOL DF210 obtained from Air Products and Chemicals, Inc). After stirring the resultant mixture for 15 minutes, 30.0 grams of melamine-formaldehyde condensate (CYMEL 385 obtained from Cytec Industries, Inc.) were added and the entire mixture was stirred for an additional 10 minutes. The initial viscosity was about 41 seconds (#4 Ford Cup), and a grind gauge measurement was determined to be 4 (Hegman).

Example 3

At ambient temperature, a water-based low cure coating composition was made by first adding 6.2 grams of potassium tripolyphosphate and 10.0 grams EFKA 5071 to 66.5 grams of deionized water. The mixture was stirred with a Cowles blade for 5 minutes. While continuing to stir the mix with a Cowles blade, the following components were added sequentially in one-minute intervals: 6.2 grams of deionized water; and 420.6 grams of FERROPHOS HRS-3095. The resultant mixture was stirred for one hour with a Cowles blade. The following items were then added sequentially in one-minute intervals while continuing to stir the mix with a Cowles blade: 30.7 grams of deionized water; 24.6 grams of elemental silicon (SI-1059 from Elkem, average particle size of <10μ); and 19.2 grams of calcium exchanged silica (SHIELDEX AC3 obtained from Davison Chemical Division of W.R. Grace & Co.). The resultant mixture was again stirred for 1 hour with a Cowles blade. A mild heating occurred as a result of the reaction being exothermic. The following items were then added sequentially in one-minute intervals while continuing to stir the mix with a Cowles blade: 10.0 grams of SURFYNOL 104DPM; 366.1 grams of the product of Example 1; 4.8 grams of Rheology Modifier RM-8; and 5.0 grams of SURFYNOL DF210. After stirring the resultant mixture for 15 minutes, 30.0 grams of CYMEL 385 were added and the entire mixture was stirred for an additional 10 minutes. The initial viscosity was about 50 seconds (#4 Ford Cup), and a grind gauge measurement was determined to be 4.5 (Hegman).

Example 4

At ambient temperature, a water-based low cure coating composition was made by first adding 6.2 grams of potassium tripolyphosphate and 10.0 grams EFKA 5071 to 66.8 grams of deionized water. The mixture was stirred with a Cowles blade for 5 minutes. While continuing to stir the mix with a Cowles blade, the following components were added sequentially in one-minute intervals: 6.3 grams of deionized water; and 421.3 grams of FERROPHOS HRS-3095. The resultant mixture was stirred for 1 hour with a Cowles blade. The following items were then added sequentially in one-minute intervals while continuing to stir the mix with a Cowles blade: 30.8 grams of deionized water; 12.4 grams of elemental silicon; and 28.9 grams of SHIELDEX AC3. The resultant mixture was again stirred for 1 hour with a Cowles blade. A mild heating occurred as a result of the reaction being exothermic. The following items were then added sequentially in one-minute intervals while continuing to stir the mix with a Cowles blade: 10.0 grams of SURFYNOL 104DPM; 367.4 grams of the product of Example 1; 4.8 grams of Rheology Modifier RM-8; and 5.0 grams of SURFYNOL DF210. After stirring the resultant mixture for 15 minutes, 30.0 grams of CYMEL 385 were added and the entire mixture was stirred for an additional 10 minutes. The initial viscosity was about 45 seconds (#4 Ford Cup), and a grind gauge measurement was determined to be 4.5 (Hegman).

Example 5

Two-sided 60 G Electrogalvanized steel (EG) and two-sided Hot-Dipped Galvanized steel (HDG) panels were obtained from USX Corporation. Each panel was 15.3 centimeters (cm) wide and 38.1 cm long. The steel panels were subjected to an alkaline cleaning process by spray in a 0.85% by weight bath of PARCO 338 (P338 from Henkel, Inc.) at a temperature of 650° C. for 10 seconds. The panels were removed from the alkaline cleaning bath, rinsed with room temperature deionized water (about 21° C.) for 5 seconds and dried with warm air (about 40° C.).

Panels were then coated with either a "SHIELDEX ONLY" composition or the composition of Examples 2–5. The "SHIELDEX ONLY" formulation was prepared as described in Example 2, except that the 49.1 grams of silicon was replaced with 38.4 grams of SHIELDEX AC3.

Panels were coated using wire drawbars and baked for 40 seconds until a peak metal temperature of 149° C. was achieved. The corresponding dried film thickness ("DFT") values for each coating are reported in Table 1. The panels were then quenched with ambient temperature deionized water and dried.

Corrosion Testing

After application of coatings to panels as described above, panel cure was determined by "MEK rubs". "MEK rubs" is a test for solvent resistance, which entails rubbing a cloth saturated with methyl ethyl ketone back and forth ("double rub") using normal hand pressure until the coating is marred. Results are shown in Table 1. Prior to performing the MEK rubs test, panels were exposed to a phosphate process that would be typical of that used by original equipment manufacturers (OEMs). The phosphate process involved the following steps:

1) Spray clean with alkaline cleaner (CK490MX (2 oz/gal-567 g/10 gal) from PPG Industries, Inc.) for 5 minutes at 120° F. and a pressure from 10 to 20 psi;
2) Perform an immersion rinse with warm tap water for approximately 20 seconds at 120° F.;
3) Apply a titanium polyphosphate immersion rinse conditioner 1 g/L (Rinse Conditioner GL from PPG Industries, Inc.) for 1 minute at 100° F.;
4) Apply an immersion phosphate (CF700 from PPG Industries, Inc.) for 2 minutes at 122° F.;
5) Perform an immersion rinse with deionized water for approximately 30 seconds at ambient temperature;
6) Perform an immersion seal with CHEMSEAL 19 (PPG Industries, Inc., CS19 (150 ppm Zr*)+10% NH$_4$OH until pH=4 to 4.5.) Apply for approximately 1 minute at ambient temperature.
7) Perform a spray bottle final rinse with deionized water. Rinse each side three times for approximately 5 seconds at ambient temperature;
8) Dry using warm air; and
9) Bake at 350° F. for 60 minutes.

After the exposure to the phosphate process, panels were placed in corrosion testing according to Industry Standard Procedure GM 9511P for 20 cycles. Relative ratings according to the percentage of red rust that formed over the entire tested surface of the panel, as well as the degree of white stain, are shown in TABLE 1.

TABLE 1

| SUBSTRATE TESTED | COATING 'Dry Film Thickness' | "MEK Rubs" | APG TESTING PANELS % Red Rust (Degree of White Stain)[1] |
|---|---|---|---|
| EG | SHIELDEX ONLY '4–5 microns' | 100+ | 10–12% (Moderate) |
| EG | Example 2 '4–5 microns' | 100+ | t<5% (Light) |
| EG | Example 3 '4–5 microns' | 100+ | 5–10% (Light) |
| EG | Example 4 '4–5 microns' | 100+ | 10–15% (Light) |
| HDG | SHIELDEX ONLY '4–5 microns' | 50+ | 15–20% (Moderate) |
| HDG | Example 2 '4–5 microns' | 50+ | <5% (Light) |
| HDG | Example 3 '4–5 microns' | 50+ | <5% (Light) |
| HDG | Example 4 '4–5 microns' | 50+ | <5% (Light) |

[1]Values based on the average of two or more test pieces.

Weld Testing

The coating compositions of the present invention were tested for spot weldability by coating two steel sheets on both sides with compositions of the present invention. Efficiency of welding for each variable was determined in accordance with test procedure FLTM BA 13 - 1 (Ford Laboratory Test Method). The test determines the actual life of the 5.5 mm (F16) electrode welding tips. Welds are done in 100 weld increments. The first 90 welds are done at 0.1 kA below expulsion. Then 10 coupons are welded and the nugget size of each weld is measured. The test continues until the average nugget diameter of a 10 coupon set is less than $4\sqrt{t}$, where t is the thickness of one coupon. Results are shown in TABLE 2.

TABLE 2

| SUBSTRATE TESTED | COATING (PMT Cure) 'Dry Film Thickness' | Number of Welds before Average nugget diameter of a 10 coupon set is less than $4\sqrt{t}$ |
|---|---|---|
| EG | Uncoated | 1200+ |
| EG | SHIELDEX ONLY '5.8 microns' | 1000 |
| EG | Example 2 '5.2 microns' | 1200+ |
| EG | Example 3 '5.6 microns' | 1200+ |
| HDG | Uncoated | 900 |
| HDG | SHIELDEX ONLY '5.3 microns' | 400 |
| HDG | Example 2 '5.7 microns' | 1000 |
| HDG | Example 3 '5.6 microns' | 1100 |

[1]The welding data included in Table 2 was evaluated using a model 150 AP resistance spot welder from Lors Corporation of Union, New Jersey, equipped with a Model 108B welding controller from Interlock Industries, Inc. and Lors Corporation. The welding current in kilo amperes (kA) was measured using a model MM-315A Weld Checker from Unitek Miyachi Corporation of Monrovia, California. MB 25Z copper welding tips from the Wheaton Company, Inc. of Warminster, Pennsylvania with a starting face diameter of 3/16 inch were used.

The data reported in TABLES 1 and 2 above shows that the coating compositions of the present invention, both with (Examples 3 and 4) and without (Example 2) SHIELDEX, compare very favorably with the "SHIELDEX ONLY" control. The panels coated with compositions according to the present invention demonstrated excellent corrosion resistance properties without metal pretreatment; the increased weldability of Examples 2 and 3 as compared with the SHIELDEX ONLY control is also demonstrated. In addition to the increased corrosion resistance and weldability, the compositions of the present invention can be cured at lower temperatures than commercially available coatings, which typically cure at temperatures of greater than 220° C.

Example 6

Four solvent-based coating compositions (Examples 5A–5D) were prepared by mixing the components in the amounts (in grams) listed in TABLE 3 into a stainless steel beaker to make premix mixtures.

TABLE 3

| Component | 5A Premix | 5B Premix | 5C Premix | 5D Premix |
|---|---|---|---|---|
| EPON 1009 Solution[2] | 41.16 | 47.52 | 44.12 | 66.18 |
| DOWANOL DPM[3] | 15.67 | 18.09 | 16.80 | 25.20 |
| RILANIT R4[4] | 1.31 | 1.52 | 1.41 | 2.11 |
| THIXATROL ST[5] | 0.70 | 0.80 | 0.75 | 1.12 |
| Xylene[6] | 6.35 | 7.33 | 6.81 | 10.21 |
| SYLOID AL-1[7] | 15.01 | 0 | 14.01 | 0 |
| Elemental Silicon[8] | 0 | 19.95 | 0 | 24.20 |
| FASCAT 4201[9] | 0.30 | 0.34 | 0.32 | 0.48 |
| Total | 80.50 | 95.55 | 84.22 | 129.50 |

[2]The EPON 1009 F solution was prepared by mixing the following components:

Charge 1:

| SOLVESSO 100 (Exxon) | 12.0 parts |
| Diacetone alcohol (Dow Chemical) | 15.0 parts |
| Xylene | 8.0 parts |
| Isophorone (Dow Chemical) | 5.0 parts |

TABLE 3-continued

| | |
|---|---|
| Cyclohexanone (Dow Chemical) | 10.0 parts |
| Methyl Amyl Ketone (Eastman Chemicals) | 5.0 parts |
| Charge 2: | |
| EPON 1009 F | 45.0 parts |

Charge 1 was added to a reaction vessel and the temperature was raised to 120° F. (49° C).
Charge 2 was then added to Charge 1 under agitation. The mixture was stirred at 120° F. (49° C.) for 1 to 1.5 hours until the EPON 1009 F was completely dissolved.
[3]Dipropyleneglycol monomethylether, obtained from Dow Chemical Company.
[4]Sulfated castor oil, obtained from Cognis.
[5]Organic castor oil derivative, obtained from Elementis Specialties.
[6]Dimethyl benzene, obtained from Ashland Chemical Inc.
[7]Silica, obtained from Grace Division.
[8]Silicon powder Grade SI-1059, obtained from Elkem Metals Co.
[9]Dibutyl tin oxide, obtained from Atofina Chemicals Inc.

The above mixtures were dispersed using approximately 1–3 millimeters (mm) diameter ceramic bead media (ER 120A 1.6/2.5 mm available from S.E.P.R. Les Miroirs; 92096 La Défense CEDEX—France) using a stainless steel horizontal flat disk blade turned by an air motor at maximum speed. The temperature of the grind was allowed to rise to 140° F. (60° C.) but no more than 160° F. (71° C.) and was maintained in that range during the dispersion. The length of dispersion was 90 minutes.

Pigments were added to the premix mixtures in the amounts (in grams) listed in TABLE 4; addition occurred over about one minute with cowles agitation.

TABLE 4

| Component | 5A Cowles | 5B Cowles | 5C Cowles | 5D Cowles |
|---|---|---|---|---|
| 5A Premix | 80.50 | 0 | 0 | 0 |
| 5B Premix | 0 | 95.55 | 0 | 0 |
| 5C Premix | 0 | 0 | 84.22 | 0 |
| 5D Premix | 0 | 0 | 0 | 129.50 |
| Zinc Powder[10] | 253.06 | 292.20 | 0 | 0 |
| FERROPHOS | 0 | 0 | 171.75 | 257.66 |
| Total | 333.56 | 387.75 | 255.97 | 387.16 |

[10]Superfine 7 Zinc Dust, obtained from U.S. Zinc.

The resultant cowles mixtures were further formulated as shown in TABLE 5, with amounts shown (in grams), by using the cowles blade and air motor at the maximum speed of the air motor for 20 minutes. The temperature of the cowles mixture was kept in the range of at least 120° F. to 140° F. during cowles dispersion; concentrated ("conc") mixtures resulted.

TABLE 5

| | 5A conc | 5B conc | 5C conc | 5D conc |
|---|---|---|---|---|
| 5A Cowles | 333.56 | 0 | 0 | 0 |
| 5B Cowles | 0 | 387.75 | 0 | 0 |
| 5C Cowles | 0 | 0 | 255.97 | 0 |
| 5D Cowles | 0 | 0 | 0 | 387.16 |
| Blocked Isocyanate Crosslinker of Example 8 | 46.75 | 53.98 | 50.11 | 75.18 |
| S-379N Wax[11] | 3.09 | 3.56 | 3.31 | 4.96 |
| CYMEL 327[12] | | | | |
| DOWANOL DPM | 16.31 | 18.83 | 17.48 | 26.22 |
| PM Acetate[13] | 32.40 | 37.41 | 34.73 | 52.10 |

TABLE 5-continued

| | 5A conc | 5B conc | 5C conc | 5D conc |
|---|---|---|---|---|
| Cyclohexanone[14] | 4.84 | 5.59 | 5.19 | 7.78 |
| Total | 441.91 | 512.84 | 372.10 | 561.37 |

[11]Polyethylene wax, obtained from Shamrock Technologies.
[12]Methylated melamine-formaldehyde, obtained from Cytec Industries, Inc.
[13]Propylene glycol monomethyl ether acetate, obtained from Eastman Chemicals.
[14]Obtained from Dow Chemical Company.

The concentrated mixtures were diluted prior to application with additional DOWANOL DPM solvent in the amounts shown in TABLE 6. It will be appreciated by those skilled in the art that the amount of solvent addition prior to application can be varied widely for the convenience of the operator with no effect on the properties of the coated metal.

TABLE 6

| | 5A | 5B | 5C | 5D |
|---|---|---|---|---|
| 5A conc | 441.91 | 0 | 0 | 0 |
| 5b conc | 0 | 512.84 | 0 | 0 |
| 5C conc | 0 | 0 | 372.10 | 0 |
| 5D conc | 0 | 0 | 0 | 561.37 |
| DOWANOL DPM | 92.78 | 107.17 | 70.73 | 106.11 |
| Total | 534.69 | 620.01 | 442.83 | 667.48 |

Example 7

Two-sided 60G Electrogalvanized steel (EG) and two-sided Hot-Dipped Galvanized steel (HDG) panels were obtained from USX Corporation. Each panel was 17.8 centimeters (cm) wide and 38.1 cm long. The steel panels were subjected to an alkaline cleaning process by spray in a 0.85% by weight bath of PARCO 338 at a temperature of 65° C. for 22 seconds in the case of EG panels and 27 seconds in the case of HDG panels. The panels were removed from the alkaline cleaning bath, rinsed with room temperature deionized water (about 21° C.) for 5 seconds and dried with warm air (about 40° C.).

The cleaned panels were then pretreated with a 5 percent solution of NUPAL 510R (phosphatized epoxy pretreatment solution, pH of 3, commercially available from PPG Industries, Inc.) by application with a nip coater. The panels with wet pretreatment were baked in a gas fired conveyor oven for 15 seconds until the peak metal temperature of the panel reached 250° F. (121° C.) to dry the pretreatment. The panels were allowed to air cool to room temperature. The weight of the pretreatment was ~10 mg/ft$^2$.

The back side of the pretreated panels were coated with Examples 5A–5D using wire drawbars and the panels were baked for 25 seconds until a peak metal temperature of approximately 230° F. (110° C.) was achieved. The panels with the dried coating on the backside were allowed to air cool to room temperature. The front side of the panels were then also coated with Examples 5A–5D using wire drawbars and the panels were baked for 25 seconds until a peak metal temperature of approximately 450° F. (232° C.) was achieved. The baked panels were cooled by quenching in a tank of water followed by a deionized water spray rinse and allowed to air dry. The corresponding dried film thickness ("DFT") values for each coating are reported in TABLE 7 below.

Prior to corrosion testing, the pretreated panels were exposed to the phosphate process described in Example 5.

After the exposure to the phosphate process, the panels were placed in corrosion testing according to GM TM-54-26 APG for 20 cycles. Relative ratings according to the percentage of red rust that formed over the entire tested surface of the panel, as well as the degree of white stain, are shown in Table 7. Weld testing was also performed on the EG panels, in the manner described in Example 5.

TABLE 7

| SUBSTRATE TESTED | COATING 'Dry Film Thickness' | Zinc PVC | Ferrophos PVC | Silica PVC | Silicon PVC | APG TESTING PANELS % Red Rust (Degree of White Stain)[1] | No. of Welds |
|---|---|---|---|---|---|---|---|
| EG | Sample 5A '4.9' | 38 | 0 | 8 | 0 | 10–40 (Heavy) | 700 |
| EG | Sample 5B '5.0' | 38 | 0 | 0 | 8 | <5 (Moderate) | 600 |
| EG | Sample 5C '7.3' | 0 | 30 | 8 | 0 | 15–25 (Heavy) | >1200 |
| EG | Sample 5D '7.0' | 0 | 30 | 0 | 8 | 5–10 Moderate | 1000 |
| HDG | Sample 5A '4.9' | 38 | 0 | 8 | 0 | 5–25 (Heavy) | Not tested |
| HDG | Sample 5B '5.0' | 38 | 0 | 0 | 8 | 5–15 (Moderate) | Not tested |
| HDG | Sample 5C '7.3' | 0 | 30 | 8 | 0 | 10–20 (Moderate) | Not tested |
| HDG | Sample 5D '7.0' | 0 | 30 | 0 | 8 | 5–15 (Moderate) | Not tested |

As demonstrated in TABLE 7, the compositions of the present invention using silicon (Samples 5B and 5D) gave better corrosion protection and comparable weldability than Samples 5A and 5C using silica.

Example 8

The blocked isocyanate crosslinker used in Example 6 was prepared from a mixture of the following ingredients:

TABLE 8

| Ingredients | Weight (grams) | Equivalents |
|---|---|---|
| Charge I: | | |
| PAPI 2940[14] | 660.0 | 5.00 |
| Xylene | 330.0 | — |
| Dibutyltindilaurate | 1.46 | — |
| Charge II: | | |
| BPA/EO adduct[15] | 431.38 | 1.75 |
| Charge III: | | |
| e-Caprolactam | 367.77 | 3.25 |
| Charge IV: | | |
| Dowanol PM Acetate[16] | 295.97 | — |

[14]Polymeric methylene diphenyl diisocyanate, obtained from the Dow Chemical Company.
[15]Adduct of Bisphenol A and a diol containing 6 ethylene oxide, obtained from BASF Corporation as MACOL 98A MOD.
[16]Acetate ester of methoxy propanol, obtained from the Dow Chemical Company.

Into a suitably equipped 5 liter round-bottom flask were added the ingredients of Charge I. Under mild agitation these ingredients were heated under a nitrogen blanket to a temperature of 50° C. Charge II was added gradually over a period of about two hours while allowing the temperature to rise to 65° C. The reaction mixture was then held at 55° C. until an NCO equivalent of 438 plus or minus 30 was reached. The reaction mixture was then brought to 95° C. and Charge III was added in portions over the period of an hour. Upon completion of the addition, the reaction mixture was held at 95° C. until the infrared spectrum showed complete reaction of the NCO group as monitored by the peak at 2270 cm$^{-1}$. The reaction mixture was then diluted with Charge IV to give the blocked isocyanate crosslinker with a solids content of 70 percent.

Whereas particular embodiments of this invention have been described above for purposes of illustration, it will be evident to those skilled in the art that numerous variations of the details of the present invention may be made without departing from the invention as defined in the appended claims.

What is claimed is:

1. A weldable composition comprising:
   a) a binder comprising the reaction product of one or more epoxy-containing materials and one or more phosphorous-containing materials;
   b) a conductive pigment; and
   c) a particulate material consisting essentially of elemental silicon.

2. The weldable composition of claim 1, wherein the epoxy-containing material is a polyglycidyl ether of a polyhydric phenol.

3. The weldable composition of claim 2, wherein the polyhydric phenol is Bisphenol A.

4. The weldable composition of claim 1, wherein the number average molecular weight of the epoxy-containing material is 220 to 25,000, as determined by multiplying the epoxy equivalent by the epoxy functionality.

5. The weldable composition of claim 4, wherein the molecular weight of the epoxy-containing material is 220 to 4500.

6. The weldable composition of claim 1, wherein the phosphorus-containing material is selected from the group consisting of phosphoric acid, a phosphonic acid, and phosphorous acid.

7. The weldable composition of claim 1, wherein the equivalent ratio of the phosphorus-containing material to epoxy-containing material is from 0.5 to 3.5:1.

8. The weldable composition of claim 1, further comprising a curing agent selected from the group consisting of aminoplast resins, polyisocyanates, polyacids, organometallic complexed materials, polyamines, and polyamides.

9. The weldable composition of claim 8, wherein the curing agent is an aminoplast.

10. The weldable composition of claim 9, wherein the aminoplast is a melamine-formaldehyde condensate.

11. The weldable composition of claim 10, wherein the melamine-formaldehyde condensate comprises at least 40 weight percent of imino groups.

12. The composition of claim 9, wherein the conductive pigment is iron phosphide.

13. The weldable composition of claim 1, wherein the conductive pigment is selected from the group consisting of zinc, aluminum, graphite, iron phosphide, tungsten, carbon black, and mixtures thereof.

14. The weldable composition of claim 13, wherein the conductive pigment is zinc and/or iron phosphide.

15. The weldable composition of claim 1, wherein the weight percent of (a) is from 20 to 90, based on the total weight of the composition.

16. The weldable composition of claim 1, wherein the weight percent of (b) is from 2 to 30, based on the total weight of the composition.

17. The weldable composition of claim 1, wherein the weight percent of (c) is from 0.5 to 30, based on the total weight of the composition.

18. The weldable composition of claim 1, wherein the weight ratio of (b) to (a) is from 0.2 to 10.

19. The weldable composition of claim 1, wherein the weight ratio of (c) to (b) is from 0.02 to 2.0.

20. The weldable composition of claim 1 further comprising one or more corrosion resistant pigments.

21. The weldable composition of claim 1, wherein said composition is aqueous-based.

22. The weldable composition of claim 1, wherein said composition is solvent-based.

23. A process for coating a metal substrate comprising:
   a) applying the composition of claim 1 to the metal substrate, wherein the composition is at a temperature of 20° C. to 150° C.;
   b) curing the coating composition on the metal substrate.

24. The process of claim 23, wherein the metal substrate comprises a ferrous metal, a non-ferrous metal, or a combination thereof.

25. The process of claim 23, wherein the metal substrate is galvanized before application of the composition.

* * * * *